United States Patent [19]

Ohara et al.

[11] Patent Number: 4,702,874
[45] Date of Patent: Oct. 27, 1987

[54] MANUFACTURING METHOD OF RELEASE PAPER

[75] Inventors: Shuzo Ohara, Kawanishi; Ryoichi Kitamura, Takaishi, both of Japan

[73] Assignee: Goyo Paper Working Co., Ltd., Osaka, Japan

[21] Appl. No.: 835,854

[22] PCT Filed: Jun. 6, 1985

[86] PCT No.: PCT/JP85/00323

§ 371 Date: Feb. 26, 1986

§ 102(e) Date: Feb. 26, 1986

[87] PCT Pub. No.: WO86/00564

PCT Pub. Date: Jan. 30, 1986

[30] Foreign Application Priority Data

Jul. 2, 1984 [JP] Japan .................................. 59-137544

[51] Int. Cl.$^4$ .............................................. B29C 47/88
[52] U.S. Cl. ...................................... 264/171; 264/213; 264/236; 264/300; 264/338; 427/411; 524/860
[58] Field of Search .................. 264/171, 300, 39, 130, 264/169, 213, 338, 236, 211.17; 427/411; 524/860

[56] References Cited

U.S. PATENT DOCUMENTS

| | | | |
|---|---|---|---|
| 3,393,106 | 7/1968 | Marrinan et al. | 264/213 |
| 3,826,677 | 7/1974 | Michels et al. | 264/213 |
| 4,052,495 | 10/1977 | Uhlmann et al. | 264/216 |
| 4,160,798 | 7/1979 | Price et al. | 264/338 |
| 4,222,973 | 9/1980 | Kasper et al. | 264/338 |
| 4,244,912 | 1/1981 | Battice | 264/338 |
| 4,301,103 | 11/1981 | Uphoff | 264/338 |
| 4,454,266 | 6/1984 | Coughlan et al. | 264/300 |
| 4,557,887 | 12/1985 | Ona et al. | 264/216 |

FOREIGN PATENT DOCUMENTS

| | | | |
|---|---|---|---|
| 60-32610 | 2/1985 | Japan | 264/300 |
| 1054069A | 11/1983 | U.S.S.R. | 264/300 |

Primary Examiner—Jeffery Thurlow
Attorney, Agent, or Firm—Armstrong, Nikaido, Marmelstein & Kubovcik

[57] ABSTRACT

The present invention relates to a method of manufacturing a release paper characterized in that a mixture of polyolefin and a silicone release agent compatible therewith comprising a reaction product of polymethyl hydrogen siloxane, vinyl group-containing poly-dimethyl siloxane and at least one of olefins or polyolefins having one or more double-bonds is extruded onto a substrate of paper, fabric, film etc., the laminate is heat treated for the release agent contained in the mixed layer of the above-mentioned laminate to bleed onto the surface of the mixed layer to be thus localized and the localized release agent is fixed by curing.

The release agent's compatibility with the polyolefin, and this film forming and stretching properties are improved, and since the release agent of high concentration is localized and fixed by curing on the surface of the release agent layer, only a small amount of the release agent is needed.

5 Claims, No Drawings

MANUFACTURING METHOD OF RELEASE PAPER

TECHNICAL FIELD OF THE INVENTION

The present invention relates to a method of manufacturing a release paper by extrusion laminating process, and more particularly to a method of manufacturing a release paper by extrusion laminate process efficiently and economically.

TECHNICAL BACKGROUND

The manufacturing method of silicone release paper mainly used hitherto is coating, the method consisting in forming a resin layer usually of polyethylene laminate on a substrate such as paper and coating a layer of release agent on its surface. The release agent used in this method consists of, for instance, polymethyl hydrogen siloxane and vinyl group-containing polydimethyl siloxane, and addition reaction takes place in the presence of platinum catalysts and under heating and the reaction product sets to form a release film.

Meanwhile, like the present invention, there is a method of forming a release layer on a substrate by an extrusion laminating process in a single stretch, but when this method is used, the resin laminated itself has a release property. As such a release resin, ethylene-α-olefin copolymer elastomer etc. is used, and it is suitable for acrylic adhesives.

When the former coating process is adopted, first polyethylene laminating is carried out on the substrate and then coating of such as silicone release agent is carried out in a separate step. Thus, the working process is in two steps, this being not advantageous in terms of equipment, time and economy. Furthermore, the release agent applied by coating is generally used together with organic solvent, which is accompanied by grave problems such as fire, explosion and environmental pollution.

On the other hand, in the latter extrusion laminating process by the use of ethylene-α-olefin copolymer elastomer etc. there is a difficulty concerning heat resistance or resistance to solvent etc. at the time of coating and scattering of release potential with regard to acrylic adhesive and the release potential becomes heavier with the lapse of time. Because the ethylene-α-olefin copolymer elastomer is difficult to extrude when it is used alone, it is used mixed with polyethylene. However, the release effect is reduced with decreasing proportion of the elastomer, whereas the increase of its proportion results in stronger characteristics of the elastomer, causing loss of the film strength and giving rise to working difficulty such as blocking.

The present inventors tried a method of extruding the release agent hitherto used by the coating process in combination with polyethylene for elimination of the defects of both methods. The conbination turned out to lack in compatibility and be extremely difficult to extrude due to its poor film forming property and poor stretching property, and curing was extremely difficult even if lamination should be feasible. As they continued their studies intensively the inventors discovered that extrusion could be markedly improved by adding a certain substance to the compound, and that curing could be easily accomplished effectively and could thus complete the present invention.

DISCLOSURE OF THE INVENTION

The present invention relates to a method of manufacturing a release paper characterized in that a mixture of polyolefin and a silicone release agent compatible therewith comprising a reaction product of polymethyl hydrogen siloxane and a vinyl group-containing polydimethyl siloxane with at least one of olefins or polyolefins having one or more double bonds is extruded onto a substrate of paper, fabric, film etc., that the laminate is heat treated for the release agent contained in the mixed layer of the above-mentioned laminate to bleed onto the surface of the mixed layer to be thus localized and that the localized release agent is fixed by curing.

As the release agent used for the method of the present invention is suited a silicone release agent compatible with polyolefin, being a reaction product of polymethyl hydrogen siloxane, a vinyl group-containing polydimethyl siloxane and at least one of olefins or polyolefins having one or more double bonds as the third component.

As olefins containing one of more double bonds are cited those 16-24 in carbon number such as octadecene, while as polyolefins are cited, for instance, 1,4-polybutadiene or its mixture with 1,2-polybutadiene, polyisoprene, polybutene etc. and mixtures thereof.

An example of release agent manufacturing method consists in mixing a polymethyl hydrogen siloxane (including polymethyl hydro-dimethyl siloxane copolymer), a vinyl group-containing polydimethyl siloxane and the above-mentioned third component, adding di-tertiary butyl peroxide as catalyst, proceeding with the reaction under heating and stopping the reaction simultaneously with recognition of the start of gelling. Alternatively, polymethyl hydrogen siloxane and the third component may be preliminary caused to react under heating with di-tertiary butyl peroxide as catalyst and the reaction product is further caused to react with the vinyl group-containing polydimethyl siloxane or the third component may be simultaneously mixed and caused to react under heating with di-tertiary butyl peroxide as catalyst and the reaction may be stopped simultaneously with recognition of the start of gelling. If reaction is stopped before start of gelling, the later curing becomes imperfect, while, if gelling is allowed to go ahead too far, localization of bleeding onto the surface of the release agent becomes difficult. After stopping of reaction, the reaction product is refined by vacuum treatment for elimination of unreacted volatile components.

The release agent synthesized by the above-mentioned method is mixed with polyolefin resin at a rate of approx. 1 to 10 weight %, more preferably 2-5 weight % based on the polyolefin resin, and kneaded and pelletized by a pelletizer as resin for mixture layer (resin for extrusion). Through adjusting of the amount added, it can be effective as release agent for various adhesives and urethane hard foam etc.

As polyolefin used in the method of the present invention polyethylene, polypropylene, 4-methyl pentene-1 resin, ethylene-vinyl acetate copolymer resin and mixtures thereof. As polyethylene linear low density polyethylene, with a density of 0.910–0.935 g/cm³ is particularly suited in low speed peeling property and, since it can be heat treated and cured at a high temperature, it is advantageous in that it can be heat treated and cured in a short length of time. For accelerating bleeding localization positively, it is possible to add ethylene-vinyl acetate copolymer resin, polyvinyl ether or the like which acts on polyolefin as a sort of plasticizer.

The resin for release layer thus obtained can be extruded onto the substrate by extrusion laminator and a release layer is formed thereby on the substrate. As the substrate for the present invention, paper, fabric, film, metallic foil and laminates thereof can be used.

The laminate formed on the substrate is heat-treated. Heat treatment is done by allowing the laminate to stand for approximately 10–60 minutes after its surface temperature has reached approximately 70–120° C. By heat treatment the release agent contained in the mixture layer bleeds toward the surface of the mixture layer to be localized and simulated is the state in which the release agent is coated on the surface of polyethylene layer as in the conventional process. This is confirmed by measurement of FT-ATR-IR.

The localized release agent is perfectly cured and fixed by catalytic treatment by the use of, for instance, chloroplatinic acid. Curing temperature is preferably approximately 100–130° C. and curing time approximately 1–60 minutes. Hence in a range in which the temperature and time of heat treatment and curing are overlapped, localization and curing may be carried out simultaneously. The dose of chloroplatinic acid is preferably in a range of $2\times10^{-2} - 3\times10^{-1}$ mg/m². Fixing by curing of the release agent is not limited to the use of platinum as catalyst but fixing by curing by the use of other catalysts, ultraviolet ray, electron beam, gamma ray etc. is also feasible. The method of imparting the catalyst is not limited to surface coating.

According to the present invention, an adhesion enhancing layer such as of polyethylene may be provided between the release agent and the substrate for improving the adhesive strength therebetween.

OPTIMUM EMBODIMENT FOR EXECUTING THE INVENTION

Hereafter the present invention is explained by giving examples and control examples, but, needless to say, the present invention is not limited thereby. Parts and percentage given hereafter mean weight parts and weight percentage unless otherwise specified. Example 1:

6.6 parts of polymethyl hydrogen siloxane ($\overline{P32}$ 5−7), 90.1 parts of vinyl group-containing polydimethyl siloxane ($\overline{P32}$ 150, vinyl group 0.7%) and 3.3 parts of polybutadiene ($\overline{MW32}$ 1600, 1,4 bondage accounting for 99%) were charged into a reactor, 0.286 parts of di-tertiary butyl peroxide was added as catalyst when the mixture was heated to 120° C., and reaction was allowed to proceed for 10 hours at 120° C., and the reactor was cooled simultaneously with start of gelling for the reaction to be stopped. The reaction product was treated for refining for 5 hours at 110° C. at a reduced pressure of 5 mmHg for elimination of unreacted volatile components.

The resulting release agent was added 3% to low-density polyethylene ("M-10P," of Mitsui Polychemical, MI:9.5, density: 0.917 g/cm³) and pellet for mixed layer was prepared by pelletizer at a die temperature of approx. 200° C. Low-density polyethylene identical to the one used for the mixed layer was used for formation of adhesion enhancing layer.

As substrate 73 g/m² "Clupak" unbleached craft paper was used, polyethylene for adhesive enhancing layer was extruded by ordinary co-extrusion laminator at a die temperature of 310° C. with simultaneous extrusion of pellet for the mixed layer at a die temperature of 280° C., and a 3-layer laminate of substrate-adhesion enhancing layer-mixed layer was thus prepared. The thickness of the mixed layer was 20 μ and that of the adhesion enhancing layer was 20 μ. The then extrusion property is shown in Table 2.

Then the 3-layer laminate was cut in sheet form and was treated for 10 min. at 120° C. with the release layer up. After heat treatment the surface of the mixture layer was coated with $1.7\times10^{-1}$ mg/m² chloroplatinic acid (0.001% IPA solution) and cured again for 20 minutes at 120° C. and the release paper was obtained.

Of the release paper thus obtained, the release potential and residual adhesion strength were measured as follows. Adhesive tape:

For the test acrylic adhesive craft tape ("Elm tape", Soken Kako) was cut to a size of 25 mm wide and 210 mm long.

Measuring conditions

The above adhesive tape was stuck to the above-mentioned release paper by pressing one stroke and back at a speed of 5 mm/second with a rubber roller of 4.5 kg in weight, and the release potential and residual adhesive strength were measured under the following conditions. After sticking of the tape, the measurement was taken after ageing for 20 hours under a pressure of 20 g/cm² in an atmosphere of 70° C. and 65% RH.

Measuring method

The force required for low speed (0.3 m/min.) peeling was measured by autograph tension tester ("Strograph-R," Toyo Seiki) and that for high speed (3 m/min., 20 m/min.) peeling was measured by high speed peeling tester (Tester Sangyo) both at a peeling angle of 180°.

Measurement was taken under the conditions of 23° C. and 65% RH.

The results of measurement are shown in Table 1.

EXAMPLE 2

In Example 1, polybutadiene, was replaced by polyisoprene ($\overline{MW32}$ 29000) and the reaction condition was changed to 120° C.×14 hours and with the resulting release paper test was made in the same way as described in Example 1. The results are shown in Table 1.

EXAMPLE 3

Polymethyl hydrogen siloxane used in Example 1 was admixed with polybutene ($\overline{MW32}$ 1450) and di-tertiary butyl peroxide was added as catalyst and after 2 hours of preliminary reaction at 120° C., the vinyl-group containing polydimethyl siloxane used in Example 1 was caused to react for 4 hours at 120° C. and a release paper was obtained in otherwise the same way, and with it a test was carried out in the same way as described in Example 1. The mixing ratio of the individual reaction components was same as in Example 1 and the coating rate of chloroplatinic acid was $1.8\times10^{-1}$ mg/m². The results are shown in Table 1.

EXAMPLE 4

In Example 3, polybutene was replaced by octadecene and after 2 hours of preliminary reaction at 120° C., reaction was conducted for 3 hours at 120° C. and a release paper was prepared in otherwise the same way and with it a test was made in the same way as described in Example 1. The coating rate of chloroplatinic acid was $1.6 \times 10^{-1}$ mg/m². The results are shown in Table 1.

CONTROL EXAMPLE 1

Polybutadiene used in Example 1 alone was mixed at the same ratio (0.099%) with low-density polyethylene, a 3-layer laminate was obtained in the same way and it was heat-treated for 10 minutes at 120° C., and with it test was made in the same way as described in Example 1. The results are shown in Table 1. Aptitude for lamination was satisfactory.

CONTROL EXAMPLE 2

In Control example 1, polybutadiene was replaced by polyisoprene used in Example 2 and release paper was prepared in otherwise the same way. The results are shown in Table 1. Aptitude for lamination was satisfactory.

CONTROL EXAMPLE 3

In Control example 1, polybutadiene was replaced by polybutene used in Example 3 and release paper was prepared in otherwise the same way. The results are shown in Table 1. Aptitude for lamination was satisfactory.

CONTROL EXAMPLE 4

In control example 1, polybutadiene was replaced by octadecene used in Example 4 and release paper was prepared in otherwise the same way. The results are shown in Table 1. Aptitude for lamination was satisfactory.

CONTROL EXAMPLE 5

Low-density polyethylene used as base resin in Example 1 only was extruded onto the same substrate for preparation of a laminate, and with it test was carried out in the same way as described in Example 1. The results are shown in Table 1. Aptitude for lamination was satisfactory.

CONTROL EXAMPLE 6

Mixture of 1.7 parts of the mixture of polymethyl hydrogen siloxane and 98.3 parts of vinyl group-containing polydimethyl siloxane was added 2.901% to low-density polyethylene in the same way as described in Example 1 and pellet for mixture layer was prepared.

Laminating was carried out by extruding polyethylene for adhesion enhancing layer by coextrusion laminator at a die temperature of 310° C., and the layer thickness was adjusted to 20 μ. With pellet for mixture layer attempt was made for extruding it at a die temperature of 280° C. with expected layer thickness of 20 μ. The extrusion rate was substantially reduced and subject to marked fluctuation, and although extrusion was somehow carried out, the film thickness was subject to marked scattering as well as laminate film width and the resulting laminate was hardly usable in practice. The extrusion performance is shown in Table 2.

Curing was infeasible although attempt to cure was made under the same conditions as in the present invention, and the silicone release agent in the release layer migrated into the adhesive tape layer, this resulting in lowering of the release performance.

As is apparent from the above results, conventional silicone release agent intended for coating has no aptitude for lamination, cannot be cured and not usable as release agent of the present invention.

TABLE 1

| | 3rd Component | Chloroplatinic acid (mg/m²) | Peeling rate (m/min) (1) 0.3 | 3 | 20 | Residual adhesion coefficient (2) (0.3 m/min) |
|---|---|---|---|---|---|---|
| Example 1 | 1,4-polybutadiene | $1.7 \times 10^{-1}$ | 40 | 100 | 95 | 95 |
| Example 2 | Polyisoprene | $1.7 \times 10^{-1}$ | 40 | 115 | 105 | 98 |
| Example 3 | Polybutene | $1.8 \times 10^{-1}$ | 35 | 98 | 100 | 96 |
| Example 4 | Octadecene | $1.6 \times 10^{-1}$ | 37 | 100 | 96 | 94 |
| Control example 1 | 1,4-polybutadiene | — | 380 | 630 | 690 | 75 |
| Control example 2 | Polyisoprene | — | 370 | 700 | 720 | 70 |
| Control example 3 | Polybutene | — | 310 | 530 | 500 | 72 |
| Control example 4 | Octadecene | — | 340 | 600 | 550 | 71 |
| Control example 5 | No addition | — | 340 | 530 | 450 | 78 |

TABLE 2

| | Release agent of present invention (Example 1) | Conventional release agent (Control example 6) |
|---|---|---|
| Compatibility w. polyethylene | Good | Poor |
| Extrusion rate in extrusion | Slightly reduced. | Considerably decreased, and subject to marked fluctuation |
| Catching of resin by screw | Good | Bad due to screw slippage |
| Laminating | No film deflection. Good elongation. | Some film deflection. Increased "neck in" due to decrease of extrusion rate. |
| Aptitude for lamination (Overall evaluation) | Positive | Negative |

As is apparent from Table 1, olefin or polyolefin having one or more double-bonds of the present invention is a minus factor in release effect but as seen from Table 2, it is apparent that it plays an important role with regard to impartation of aptitude for lamination in the process of manufacture of release paper by the extrusion method. According to the present invention, exhibiting the release effect are two components of polyorganosiloxane type assuming three-dimensional crosslinking structure by fixation by curing.

INDUSTRIAL POSSIBILITY OF UTILIZATION

According to the present invention, compatibility with polyolefin, film forming property and stretching property were improved through reaction of olefin or polyolefin having one or more double bonds as third component with release components and its extrusion property can be astonishingly improved. Also since the release agent is localized and fixed at a high concentration on the surface of the release layer by heat treatment and curing, remarkable release effect could be attained despite the small proportion of release agent to the polyolefin and a manufacturing method of release paper cheap and high in productivity can be provided.

The release paper of the present invention is widely used as release paper for adhesive tape, tack paper and sticker etc., as "process paper" for synthetic leatherette, urethane etc.

What is claimed is:

1. A method of manufacturing a release paper comprising:
   (1) extruding a mixture of a polyolefin resin A and a silicone release agent B compatible therewith onto a substrate to prepare a laminate, said silicone release agent comprising a reaction product obtained by reacting (a) a polymethyl hydrogen silicone, (b) a vinyl group-containing poly-dimethyl siloxane, and (c) at least one compound selected from the group consisting of olefins and polyefins having at least one double bond, said reaction being stopped at the start of gelling;
   (2) heat treating the obtained laminate to cause the silicone release agent B contained in the extruded mixture of the polyolefin A and the silicone release agent B to bleed onto the surface of the mixture and thus become localized; and then
   (3) curing the localized silicone release agent B to fix it.

2. A manufacturing method as recited in claim 1, wherein said polyolefin (c) having at least one double bond is at least one selected from the group consisting of 1,4-polybutadiene, a mixture of 1,4-polybutadiene and 1,2-polybutadiene polyisoprene and polybutene.

3. A manufacturing method as recited in claim 1, wherein said polyolefin resin A is selected from the group consisting of polyethylene, polypropyrene, 4-methylpentene-1 resin, ethylene-vinyl acetate copolymer resin and mixtures thereof.

4. A manufacturing method as recited in claim 1, wherein said release agent B is mixed with the polyolefin resin A at approximately 1-10 weight percents based on the weight of said polyolefin resin (A).

5. A manufacturing method as recited in claim 1, wherein said heat treatment is carried out by leaving said laminate for approximately 10-60 minutes after its surface temperature has reached approximately 70°-120° C.

* * * * *